(12) United States Patent
Preus et al.

(10) Patent No.: US 10,167,661 B2
(45) Date of Patent: Jan. 1, 2019

(54) SYSTEMS AND METHODS FOR CONTROLLING GARAGE DOOR OPENER OPERATIONS

(71) Applicant: TTI (MACAO COMMERCIAL OFFSHORE) LIMITED, Macau (MO)

(72) Inventors: Michael Preus, Greenville, SC (US); William McNabb, Anderson, SC (US)

(73) Assignee: TTI (MACAO COMMERCIAL OFFSHORE) LIMITED, Macau (MO)

(*) Notice: Subject to any disclaimer, the term of this patent is extended or adjusted under 35 U.S.C. 154(b) by 0 days.

(21) Appl. No.: 15/788,867

(22) Filed: Oct. 20, 2017

(65) Prior Publication Data

US 2018/0112454 A1   Apr. 26, 2018

Related U.S. Application Data

(60) Provisional application No. 62/410,544, filed on Oct. 20, 2016.

(51) Int. Cl.
| | |
|---|---|
| E05F 15/74 | (2015.01) |
| E05F 15/77 | (2015.01) |
| G08C 17/02 | (2006.01) |
| H04Q 9/00 | (2006.01) |

(Continued)

(52) U.S. Cl.
CPC .............. *E05F 15/77* (2015.01); *E05F 15/74* (2015.01); *E05F 15/79* (2015.01); *G08C 17/02* (2013.01); *H04Q 9/00* (2013.01); *E05F 2015/765* (2015.01); *E05F 2015/767* (2015.01); *E05Y 2400/32* (2013.01); *E05Y 2900/106* (2013.01)

(58) Field of Classification Search
USPC .................................................. 340/5.7–5.73
See application file for complete search history.

(56) References Cited

U.S. PATENT DOCUMENTS

| | | | |
|---|---|---|---|
| 4,338,526 A | 7/1982 | Martin et al. | |
| 4,360,801 A | 11/1982 | Duhame | |
| 4,433,274 A | 2/1984 | Duhame | |

(Continued)

FOREIGN PATENT DOCUMENTS

WO   2006083551   8/2006

OTHER PUBLICATIONS

European Patent Office Search Report for Application No. 17197535.2 dated Mar. 22, 2018 8 pages.

*Primary Examiner* — Allen T Cao
(74) *Attorney, Agent, or Firm* — Michael Best & Friedrich LLP

(57) ABSTRACT

A garage door opener system includes sensor components and actuatable components. When a condition is detected based on sensor output, a responsive action is selected. The actuatable component is controlled to perform the selected responsive action. Accessory sensors and actuatable accessories may be in communication with the garage door system. When the accessories are found to be present by the garage door opener system, and a condition is detected by the accessory sensor, a responsive action is selected and the actuatable accessory is controlled to perform the responsive action. In either case, the responsive actions may be selected based on rules. The responsive actions may be performed by a combination of the actuatable components of the garage door opener system and the actuatable accessories in communication with the garage door opener system.

20 Claims, 10 Drawing Sheets

(51) Int. Cl.
*E05F 15/79* (2015.01)
*E05F 15/73* (2015.01)

(56) References Cited

U.S. PATENT DOCUMENTS

| | | | |
|---|---|---|---|
| 4,464,651 A | 8/1984 | Duhame | |
| 5,646,525 A * | 7/1997 | Gilboa | F41G 3/225 |
| | | | 324/207.17 |
| 5,835,452 A * | 11/1998 | Mueller | G01V 1/284 |
| | | | 367/75 |
| 7,183,933 B2 | 8/2007 | Dzurko et al. | |
| 7,262,572 B2 | 8/2007 | Fitzgibbon | |
| 7,498,936 B2 | 3/2009 | Maeng | |
| 7,602,283 B2 | 10/2009 | John | |
| 7,683,794 B2 | 3/2010 | Contreras | |
| 7,710,284 B2 | 5/2010 | Dzurko et al. | |
| 8,643,467 B2 | 2/2014 | Chutorash et al. | |
| 8,669,878 B1 | 3/2014 | Vantilburg | |
| 9,230,378 B2 | 1/2016 | Chutorash et al. | |
| 9,405,360 B2 | 8/2016 | Ang | |
| 9,458,657 B2 | 10/2016 | French et al. | |
| 9,756,233 B2 | 9/2017 | Lee et al. | |
| 9,811,958 B1 * | 11/2017 | Hall | H04W 4/35 |
| 9,879,466 B1 * | 1/2018 | Yu | E05F 15/76 |
| 2006/0220834 A1 | 10/2006 | Maeng | |
| 2006/0271212 A1 | 11/2006 | Fitzgibbon | |
| 2009/0160637 A1 | 6/2009 | Maeng | |
| 2009/0189779 A1 | 7/2009 | Gao | |
| 2011/0063101 A1 | 3/2011 | Cristoforo | |
| 2012/0260575 A1 | 10/2012 | Monaco | |
| 2013/0328663 A1 | 12/2013 | Ordaz | |
| 2014/0118111 A1 * | 5/2014 | Saladin | E05F 15/77 |
| | | | 340/7.51 |
| 2015/0084779 A1 * | 3/2015 | Saladin | G07C 9/00896 |
| | | | 340/686.6 |
| 2015/0281658 A1 | 10/2015 | Lee et al. | |
| 2015/0302735 A1 | 10/2015 | Geerlings et al. | |
| 2016/0117879 A1 | 4/2016 | Chutorash et al. | |
| 2016/0148494 A1 | 5/2016 | Kim | |
| 2016/0210844 A1 | 7/2016 | Kim | |
| 2016/0230446 A1 | 8/2016 | Rowe | |
| 2017/0004700 A1 | 1/2017 | Kim | |
| 2017/0016267 A1 | 1/2017 | French et al. | |
| 2017/0294113 A1 | 10/2017 | McNabb | |
| 2017/0295658 A1 | 10/2017 | Whitmire et al. | |

* cited by examiner

SYSTEMS AND METHODS FOR CONTROLLING GARAGE DOOR OPENER OPERATIONS

RELATED APPLICATIONS

This application makes reference to, claims priority to, and claims the benefit of U.S. Provisional Patent Application Ser. No. 62/410,544, filed on Oct. 20, 2016, which is incorporated herein by reference in its entirety.

TECHNICAL FIELD

The present invention relates to systems and methods of detecting conditions in environments associated with devices, such as garage door openers, and responding to the conditions through control of components of the devices.

SUMMARY

In some embodiments, a method of controlling a garage door opener is provided. The method includes an electronic processor detecting a condition in a space associated with the garage door opener based on output of a condition sensor and determining a current time. The method further includes selecting, by the electronic processor, a responsive action based on the detected condition and the current time. The method further includes controlling, by the electronic processor, a component of the garage door opener to perform the responsive action.

In some embodiments, a garage door opener is provided including a condition sensor, a clock, and a component that are in communication with an electronic processor. The electronic processor configured to detect a condition in a space associated with the garage door opener based on output of the condition sensor and to determine a current time. The electronic processor further configured to select a responsive action based on the detected condition and the current time. The electronic processor further configured to control the component of the garage door opener to perform the responsive action.

In some embodiments, another method of controlling a garage door opener is provided. The method includes an electronic processor determining the presence of a condition accessory in communication with the garage door opener and determining the presence of an actuatable accessory in communication with the garage door opener. The method further includes the electronic processor detecting a condition based on the condition accessory. The method further includes selecting, by the electronic processor, a responsive action based on the detected condition. The method further includes controlling, by the electronic processor, the actuatable accessory to perform the responsive action.

In some embodiments, another garage door opener is provided including a condition accessory and an actuatable accessory that are in communication with an electronic processor. The electronic processor is configured to determine the presence of the condition accessory in communication with the garage door opener and to determine the presence of the actuatable accessory in communication with the garage door opener. The electronic processor is further configured to detect a condition based on the condition accessory. The electronic processor is further configured to select a responsive action based on the detected condition and to control the actuatable accessory to perform the responsive action.

Other features and aspects of the invention will become apparent by consideration of the following detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Figure 1:
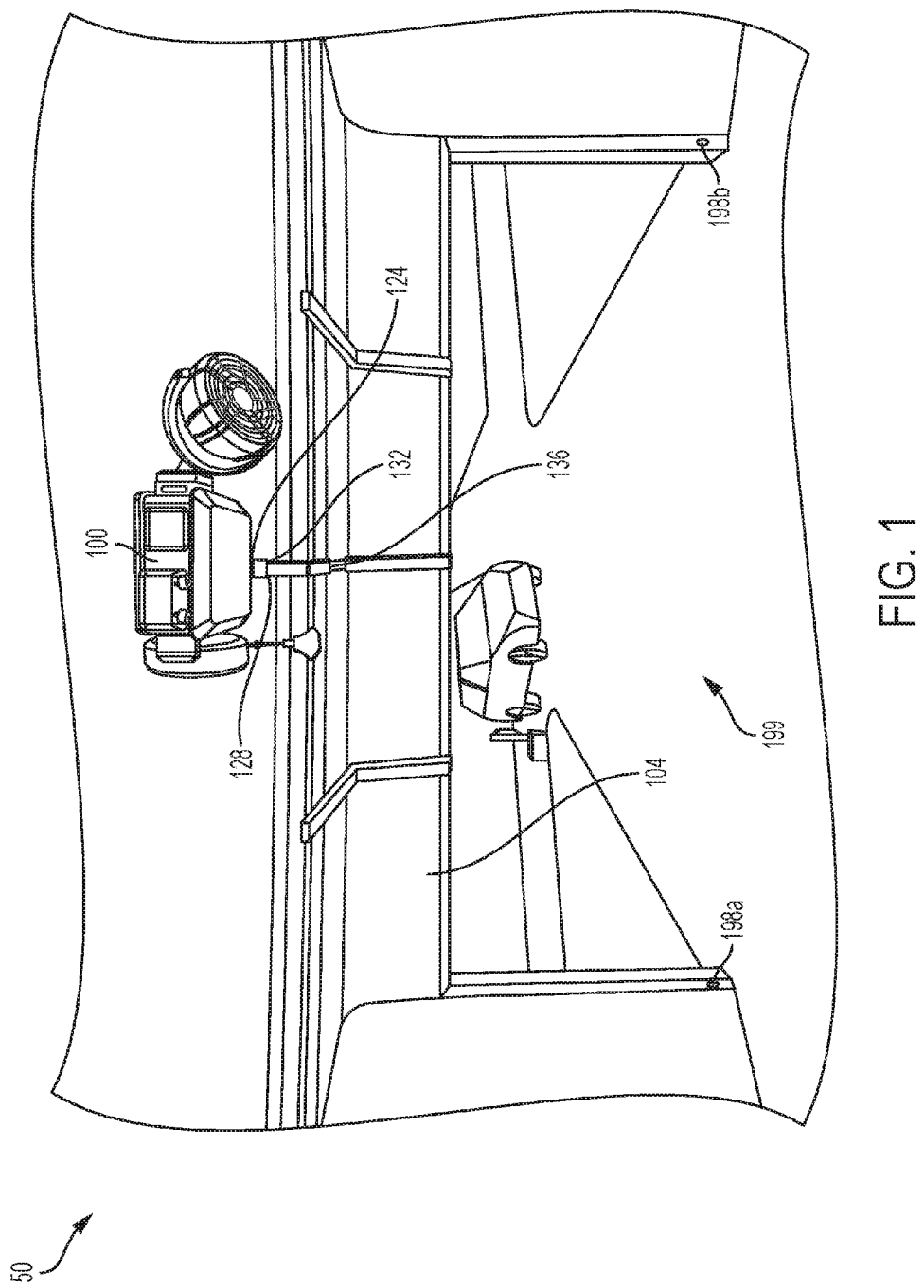
FIG. 1 is a view of a garage door opener system.
Figure 2:
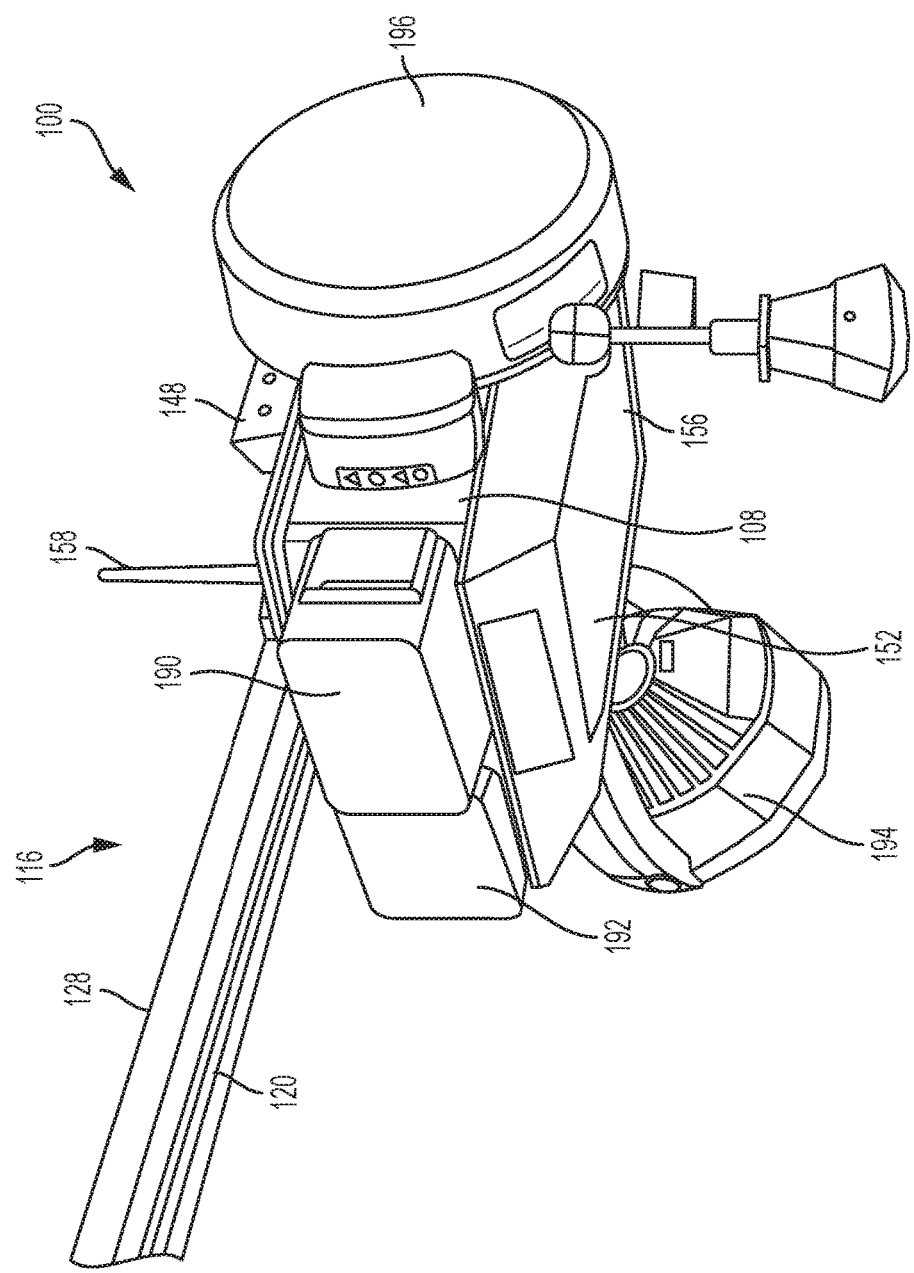
FIG. 2 is a view of a garage door opener of the garage door system in FIG. 1.

FIGS. 1-2 illustrate a garage door system 50 including a garage door opener 100 operatively coupled to a garage door 104. The garage door opener 100 includes a housing 108 supporting a motor that is operatively coupled to a drive mechanism 116. The drive mechanism 116 includes a transmission coupling the motor to a drive chain 120 having a shuttle 124 configured to be displaced along a rail assembly 128 upon actuation of the motor. The shuttle 124 may be selectively coupled to a trolley 132 that is slidable along the rail assembly 128 and coupled to the garage door 104 via an arm member.

The trolley 132 is releaseably coupled to the shuttle 124 such that the garage door system 50 is operable in a powered mode and a manual mode. In the powered mode, the trolley 132 is coupled to the shuttle 124 and the motor is selectively driven in response to actuation by a user (e.g., via a key pad or wireless remote in communication with the garage door opener 100). As the motor is driven, the drive chain 120 is driven by the motor along the rail assembly 128 to displace the shuttle 124 (and, therefore, the trolley 132), thereby opening or closing the garage door 104. In the manual mode, the trolley 132 is decoupled from the shuttle 124 such that a user may manually operate the garage door 104 to open or close without resistance from the motor. The trolley 132 may be decoupled, for example, when a user applies a force to a release cord 136 to disengage the trolley 132 from the shuttle 124. In some embodiments, other drive systems are included such that, for example, the drive mechanism 116 includes a transmission coupling the motor to a drive belt that is operatively coupled to the garage door 104 via a rail and carriage assembly.

The housing 108 is coupled to the rail assembly 128 and a surface above the garage door (e.g., a garage ceiling or support beam) by, for example, a support bracket 148. The garage door opener further includes a light unit 152 including a light (e.g., one or more light emitting diodes (LEDs)) enclosed by a transparent cover or lens 156), which provides light to the garage. The light unit 152 may either be selectively actuated by a user or automatically powered upon actuation of the garage door opener 100. In one example, the light unit 152 may be configured to remain powered for a predetermined amount of time after actuation of the garage door opener 100.

The garage door opener 100 further includes an antenna 158 enabling the garage door opener 100 to communicate wirelessly with other devices, such as a smart phone or network device (e.g., a router, hub, or modem), as described in further detail below. The garage door opener 100 is also configured to receive, control, and/or monitor a variety of accessory devices, such as a backup battery unit 190, a speaker 192, a fan 194, and an extension cord reel 196, among others.

The garage door opener further includes an obstruction sensor including a transmitter 198a that emits an infrared beam and a receiver 198b that receives the infrared beam emitted from the transmitter 198a. The transmitter 198a may be placed on opposite sides of a garage door opening 199, as illustrated in FIG. 1, and used to detect objects (e.g., animals, persons, bicycles) in the path of the garage door. The transmitter 198a and the receiver 198b may be collectively referred to as an obstruction sensor 198.

Figure 3A:
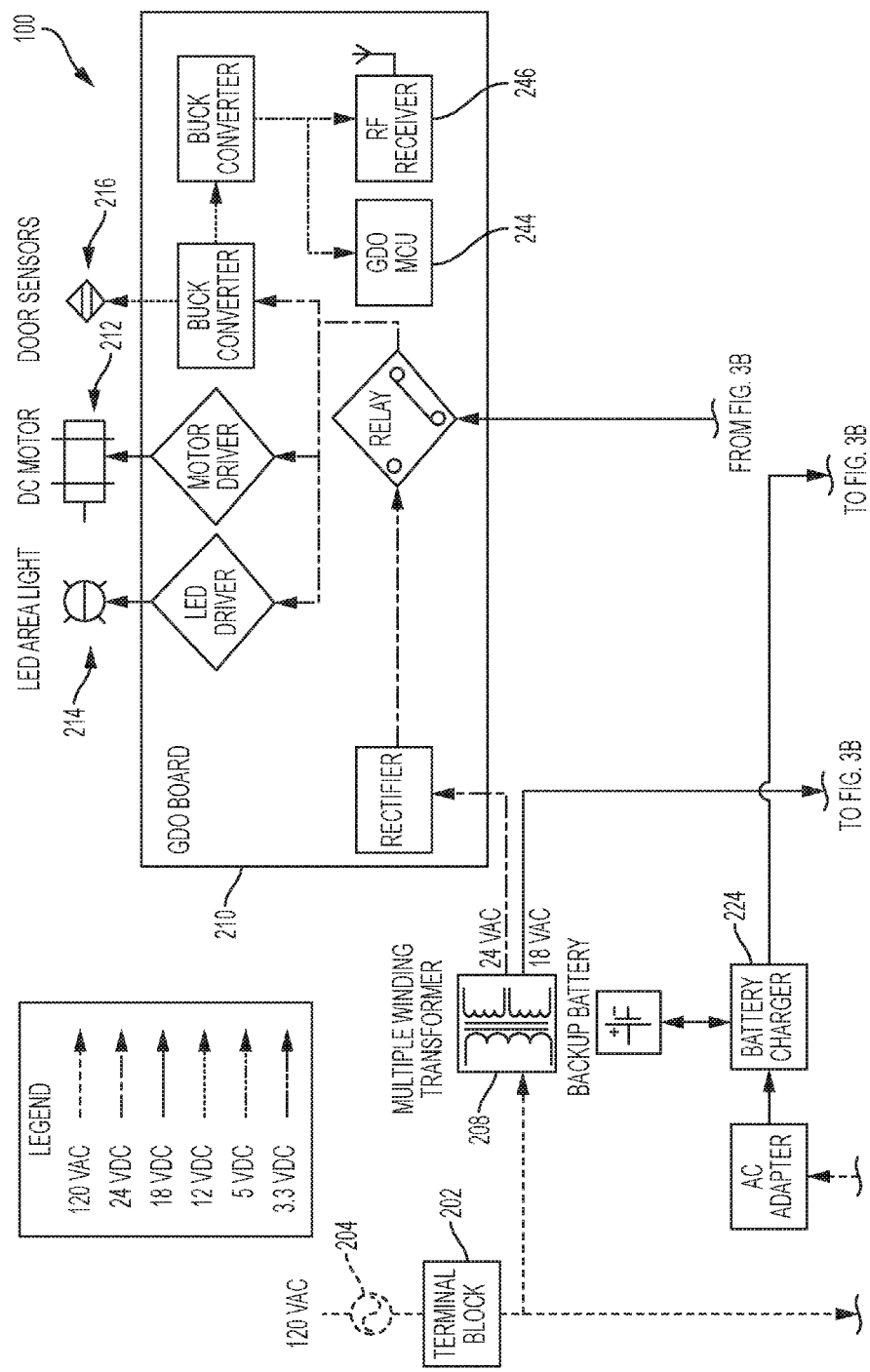
FIGS. 3A-3B illustrate a block power diagram of the garage door opener of FIG. 2.
Figure 3B:
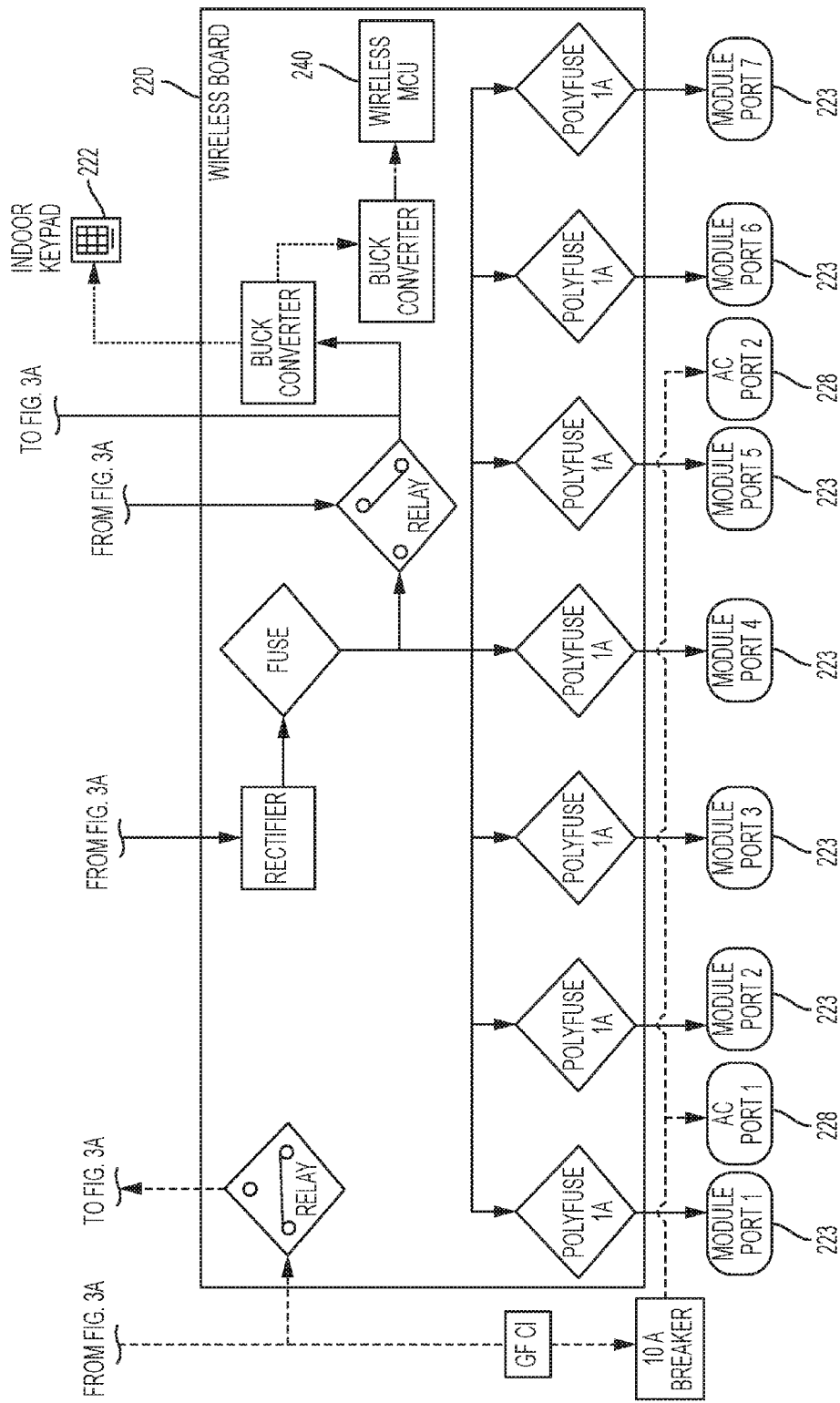

FIGS. 3A-3B illustrate a block power diagram of the garage door opener 100. The garage door opener 100 includes a terminal block 202 configured to receive power from an external power source 204, such as a standard 120 VAC power outlet. The terminal block 202 directs power, via a transformer 208, to a garage door opener (GDO) board 210 for supply to components thereof as well as a motor 212 (used to drive the drive mechanism 116, as described above), LEDs 214 (of the light unit 152), and garage door sensors 216. Examples of garage door sensors include motion sensors for detecting motion of objects in a space associated with the garage door, position sensors for detecting garage door position, and obstruction sensors for detecting objects in the path of the garage door. The terminal block 202 further directs power via the transformer 208 to a wireless board 220 and components thereof, as well as a wired keypad 222 and module ports 223. The terminal block 202 also directs power to a battery charger 224 and AC ports 228. The module ports 223 are configured to receive various accessory devices, such as a speaker, a fan, an extension cord reel, a parking assist laser, an environmental sensor, a flashlight, and a security camera. One or more of the accessory devices are selectively attachable to and removable from the garage door opener 100, and may be monitored and controlled by the garage door opener 100.

The wireless board 220 includes a wireless microcontroller 240, among other components. The GDO board 210 includes, among other components, a garage door opener (GDO) microcontroller 244 and a radio frequency (RF) receiver 246.

Figure 4:
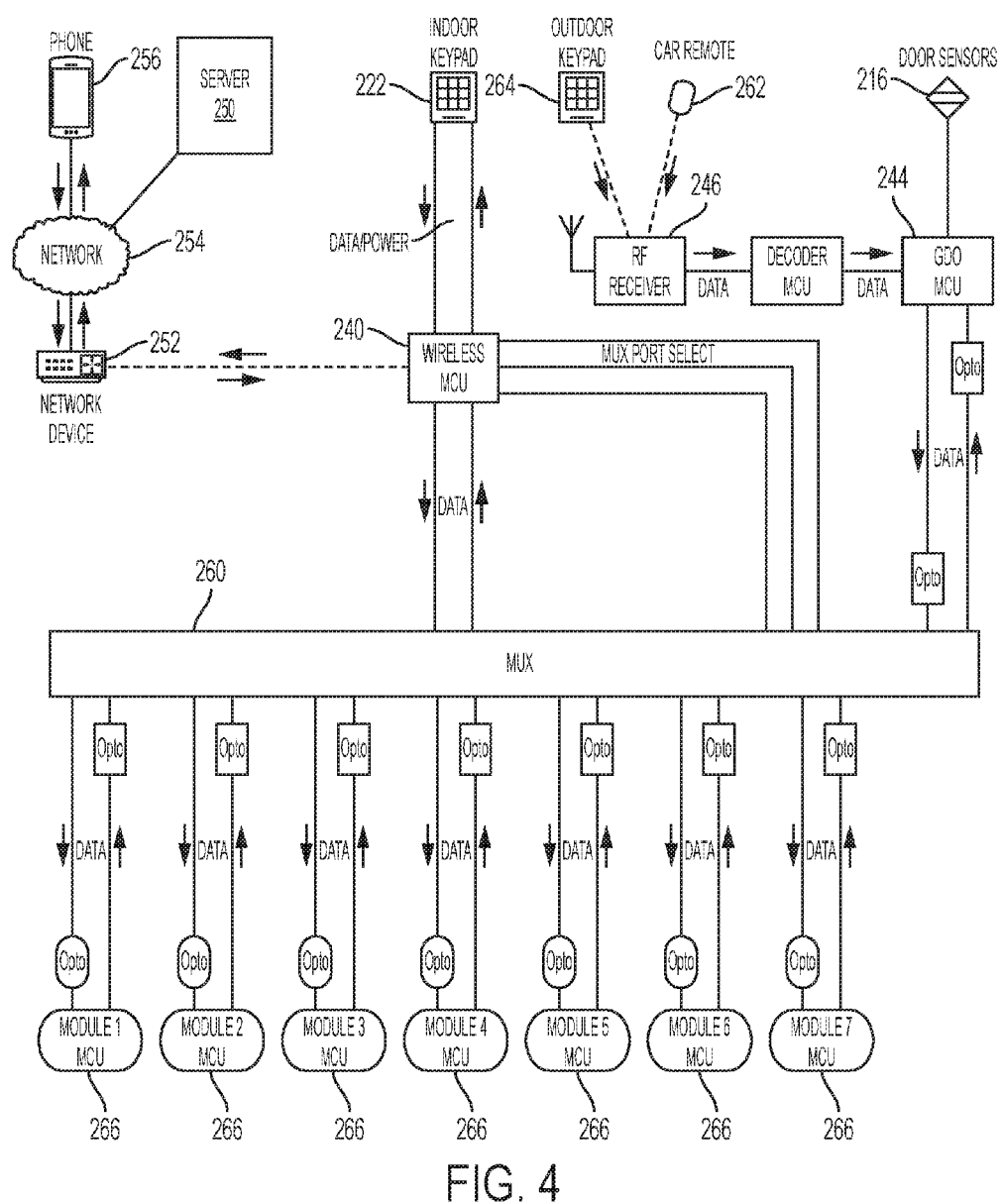
FIG. 4 is a block communication diagram of the garage door opener of FIG. 2.

FIG. 4 illustrates a block communication diagram of the garage door opener 100. The wireless microcontroller 240 is coupled to the antenna 158 and enables wireless communication with a server 250 via a network device 252 and network 254, as well as with a personal wireless device 256, such as a smart phone, tablet, or laptop. The network device 252 may be, for example, one or more of a router, hub, or modem. The network 254 may be, for example, the Internet, a local area network (LAN), another wide area network (WAN) or a combination thereof. The wireless microcontroller 240 may include, for example, a Wi-Fi radio including hardware, software, or a combination thereof enabling wireless communications according to the Wi-Fi protocol. In other embodiments, the wireless microcontroller 240 is configured to communicate with the server 250 via the network device 252 and network 254 using other wireless communication protocols. The network 254 may include various wired and wireless connections to communicatively couple the garage door opener 100 to the server 250. As illustrated, the wireless microcontroller 240 also includes wired communication capabilities for communicating with the GDO microcontroller 244 via the multiplexor 260. In some embodiments, the wireless microcontroller 240 and the GDO microcontroller 244 are directly coupled for communication. In some embodiments, the wireless microcontroller 240 and the GDO microcontroller 244 are combined into a single controller.

The RF receiver 246 is wirelessly coupled to various user actuation devices, including one or more wireless remotes 262 and wireless keypads 264, to receive and provide to the GDO microcontroller 244 user actuation commands (e.g., to open and close the garage door 104). The personal wireless device 256 may also receive user input and, in response, provide (directly or via the network 254) to the wireless microcontroller 240 user actuation commands for the garage door opener 100 or commands to control one or more of the accessory devices. The multiplexor 260 enables communication between and among the wireless microcontroller 240, the GDO microcontroller 244, and the accessory microcontrollers 266 (of the accessory devices previously noted).

Figure 5:
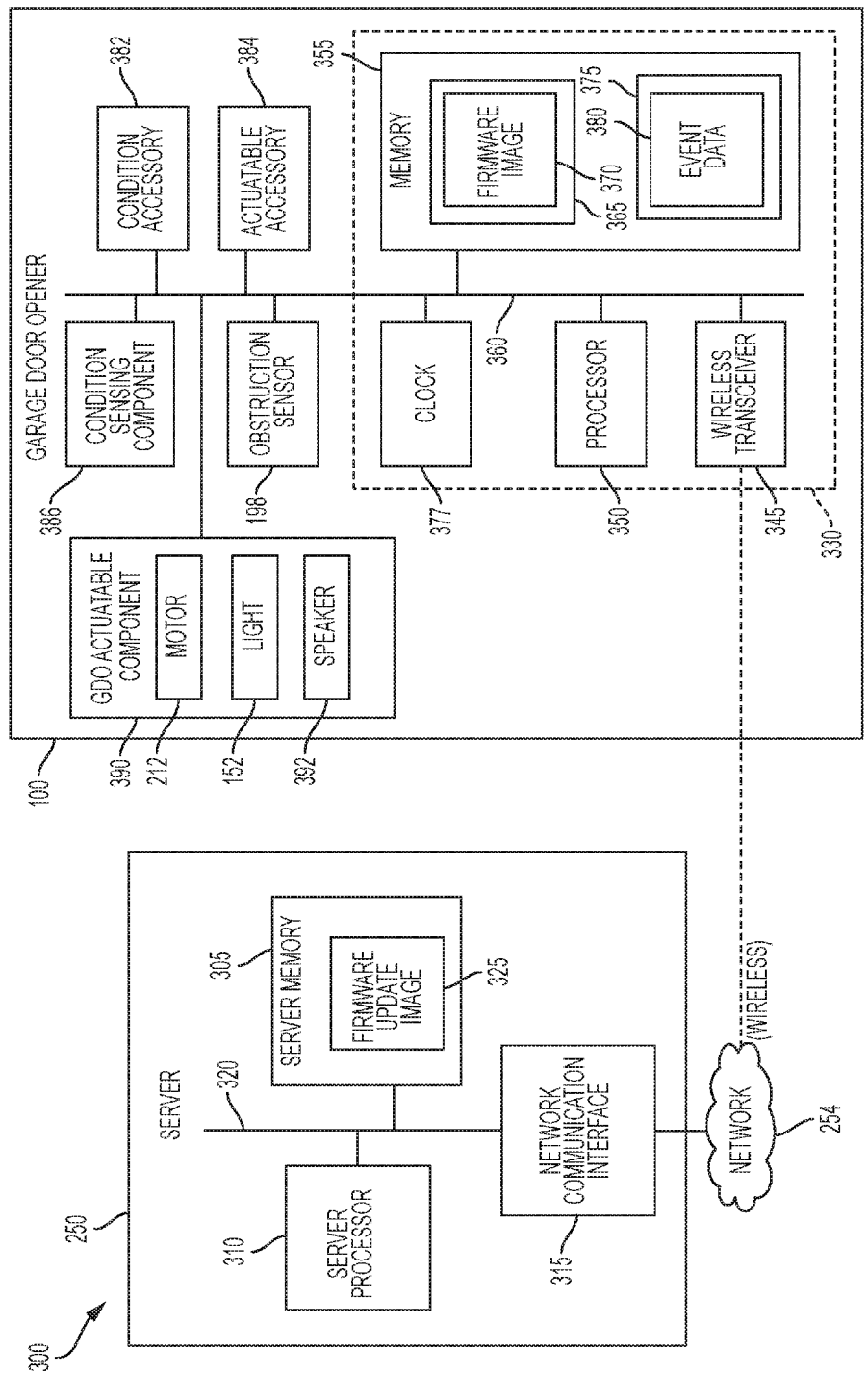
FIG. 5 is a diagram of a garage door system including the garage door opener of FIG. 2.

FIG. 5 illustrates a diagram of a garage door system 300. The garage door system 300 includes the garage door opener 100, server 186, and network 254. For ease of illustration and description, the network device 252 is considered part of the network 254 in FIG. 5 and not separately illustrated. The server 250 includes a server memory 305, a server processor (e.g., an electronic server processor) 310, and a network communication interface 315 coupled by a communication bus 320. Stored on the server memory 305 is a firmware update image 325. The firmware update image 325 may be received from another device (e.g., another computer coupled to the network 254) and is a firmware update to be used to update the firmware residing on the garage door opener 100.

The garage door opener 100 includes a wireless controller 330. Only select components of the wireless controller 330 are illustrated, including a wireless transceiver 345, a processor (e.g., an electronic processor) 350, a memory 355, and a clock 377. The wireless transceiver 345 may be part of the wireless microcontroller 240 (FIG. 4). The processor 350 and memory 355 may be part of the GDO microcontroller 244 (FIG. 4). The processor 350, memory 355, and wireless transceiver 345 are in communication via a communication bus 360, which may include the multiplexor 260 (FIG. 4). The memory 355 includes a first nonvolatile memory block 365 storing a firmware image 370 and a second nonvolatile memory block 375 storing event data 380. The clock 377 may be a real-time clock that tracks the current date and time. Although shown separately, in some embodiments, the clock 377 is provided within the processor 350. In some embodiments, the clock 377, or another clock similar to the clock 377, is provided on the server 250. The processor 350 is in communication with the clock 377 to receive the current date and time.

The garage door opener 100 further includes accessories including a condition accessory 382 and an actuatable accessory 384, the obstruction sensor 198, a condition sensing component 386, and garage door opener (GDO) actuatable components 390. The GDO actuatable components 390 include, for example, the motor 212, the light unit 152, and a speaker 392. In some embodiments, the GDO actuatable components 390 are each hardwired and integrated into the garage door opener 100, rather than selectively attached to an exterior of the housing 108 for ease of user attachment, removal, and replacement (e.g., similar to the fan 194 illustrated in FIG. 2).

As noted above with reference to FIG. 1, the obstruction sensor 198 includes the transmitter 198*a* that emits an infrared beam and the receiver 198*b* that receives the infrared beam. The obstruction sensor 198 may be configured to output a first signal to the processor 350 when the beam from the transmitter 198*a* is received by the receiver 198*b* and not obstructed (e.g., by an object), and to output a second signal to the processor 350 when the beam is obstructed.

The condition sensing component 386 is configured to sense a condition associated with the garage door opener 100 or an associated space thereof, and output an indication of the sensed condition to the garage door opener 100. In some embodiments, the condition sensing component 386 is hardwired or integrated into the garage door opener 100, rather than selectively attached to an exterior of the housing 108 for ease of user attachment, removal, and replacement. The condition sensing component 386 may include one or more motion sensors for detecting motion of objects in a space associated with the garage door opener 100, position sensors for detecting a position of the garage door 104, door sensors for detecting a position of a hinged door or lid (independent of the garage door 104), or a combination thereof. In some embodiments, the one or more motion sensors include one or more passive infrared (PIR) motion sensors. Each motion sensor provides an indication to the processor 350 upon detecting motion in a sensing region covered by the motion sensor. As noted, the motion sensors are for detecting motion of objects in a space associated with the garage door opener 100. The space associated with a garage door opener 100 in which the motion sensors are detecting motion may be, for example, an area within the garage in which the garage door opener 100 is located or an area within infrared line-of-sight of the garage in which the garage door opener 100 is located. In other words, in some embodiments, the motion sensors may be attached to the garage in which the garage door opener 100 is located, on an internal portion of the garage or on an external portion of the garage. In some embodiments, the space associated with the garage door opener 100 includes along a path associated with the garage, such as along a driveway. In some embodiments, multiple motion sensors are aimed at different spaces associated with the garage door opener 100, and the garage door opener 100 is, therefore, configured to determine whether motion is occurring in any of multiple different spaces associated with the garage door opener 100.

In some embodiments, the position sensors for detecting a position of the garage door 104 include an optical sensor aimed at the garage door 104 that outputs data to the processor 350 indicative of the position and movement of the garage door 104. In some embodiments, the position sensors are configured to track movement of the motor 212 or another component mechanically coupled to the garage door 104, and to output data indicative of the position and movement of the garage door 104. Based on the output data of the one or more position sensors, the processor 350 is operable to determine the position of the garage door 104.

In some embodiments, the door sensors detect whether a hinged door (e.g., providing access for individuals to the garage in which the garage door opener 100 is located) is open or closed. In some embodiments, the door sensors detect whether a hinged lid or door of a safe, cabinet, trunk, or the like, is open or closed. The door sensors provide an indication of whether the hinged door is open or closed to the processor 350. Each of the condition sensing components 386, in addition to the indicators provided to the processor 350, may provide an identifier to the processor 350 such that the processor 350 is operable to determine which of the condition sensing components 386 is providing the indication.

While only one condition sensing component 386 is illustrated in FIG. 5, in some embodiments, the garage door opener 100 may include two or more condition sensing components 386.

The condition accessory 382 is an accessory device, such as the backup battery unit 190, the speaker 192, the fan 194, the extension cord reel 196, the parking assist laser, the environmental sensor, the flashlight, and the security camera noted above. The actuatable accessory 384, like the condition accessory 382, is an accessory device, such as the backup battery unit 190, the speaker 192, the fan 194, the extension cord reel 196, the parking assist laser, the environmental sensor, the flashlight, and the security camera noted above. While only one condition accessory 382 and one actuatable accessory 384 are illustrated in FIG. 5, the garage door opener 100 may include two or more condition accessories 382 and two or more actuatable accessories 384. For example, with reference to FIGS. 3A-3B, the garage door opener 100 is illustrated with seven module ports 223, each of which may receive an accessory device, which may be either one of the condition accessories 382 or the actuatable accessories 384. Additionally, as can be appreciated based on the below description, a particular accessory device of the garage door opener 100 may, in a first moment in time, be considered the condition accessory 382 and, in a second moment in time, be the actuatable accessory 384.

Figure 6:
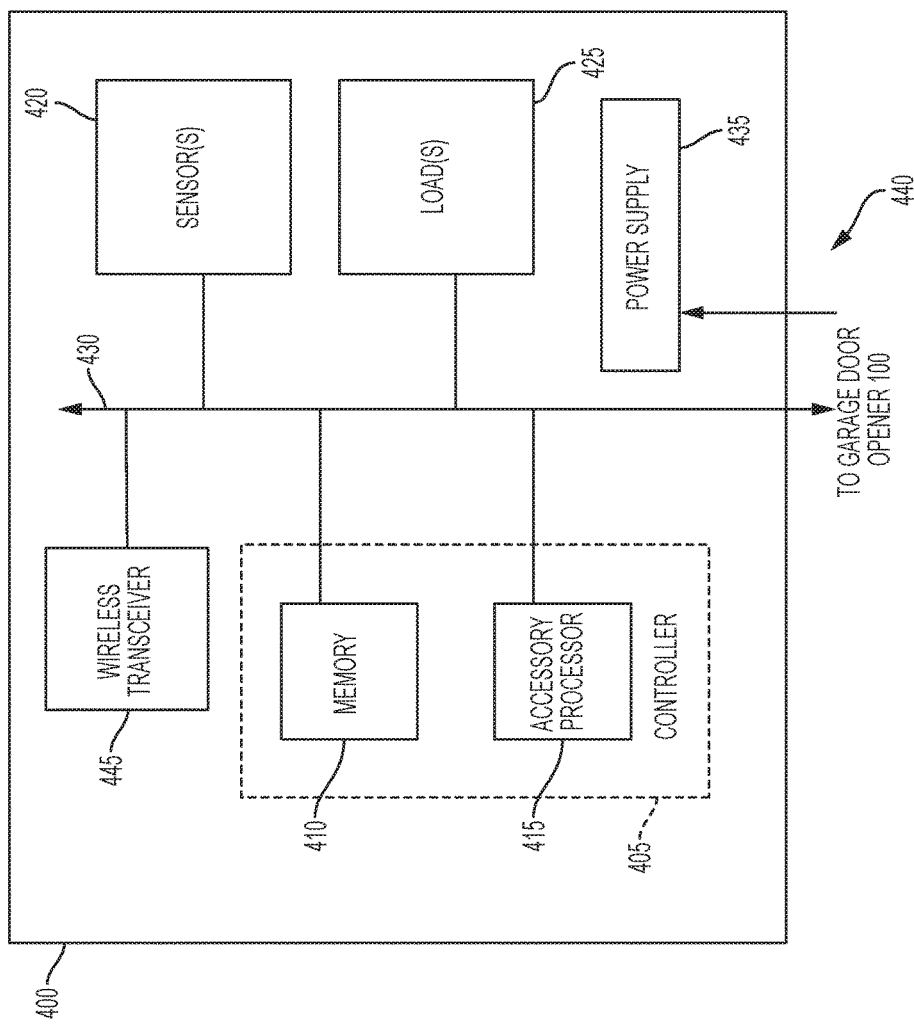
FIG. 6 is a diagram of an accessory device operable with the garage door system of FIG. 5.

FIG. 6 illustrates an accessory (e.g., an electronic accessory) 400, such as the condition accessory 382 or the actuatable accessory 384. As illustrated, the accessory 400 includes a controller 405 having a memory 410 and an accessory processor (e.g., an electronic accessory processor) 415, one or more sensors 420 (e.g., temperature sensors, humidity sensors, carbon monoxide sensors, motion sensors, and the like), and one or more loads 425 (e.g., lights, speakers, fan motor, and the like) coupled by a bus 430. The accessory 400 further includes a power supply 435 that receives power from the garage door opener 100, conditions and filters the power, and provides the power to the other components of the accessory 400. The controller 405 executes software, which may be stored in memory 410, to carry out the functions of the accessory 400 described herein. The particular sensors 420, loads 425, and functions of the controller 405 vary depends on the type of accessory 400. For example, in some embodiments, the accessory 400 does not include one of the sensors 420; and, in other embodiments, the accessory 400 does not include one of the loads 425. The controller 405 may be, for example, the microcontroller 266 for each accessory noted above with respect to FIG. 4.

The accessory 400 is coupled to the garage door opener 100 via an interface 440 to enable data communications between the controller 405 and the garage door opener 100 and to provide power to the accessory 400 from the garage door opener 100. In some embodiments, the accessory 400 is selectively attachable to and removable from the garage door opener 100. In such embodiments, the interface 440 includes an electro-mechanical connector enabling the physical mounting of the accessory 400 to the garage door opener 100 and an electrical connection for power and data transmission between the accessory 400 and the garage door opener 100.

Figure 7:
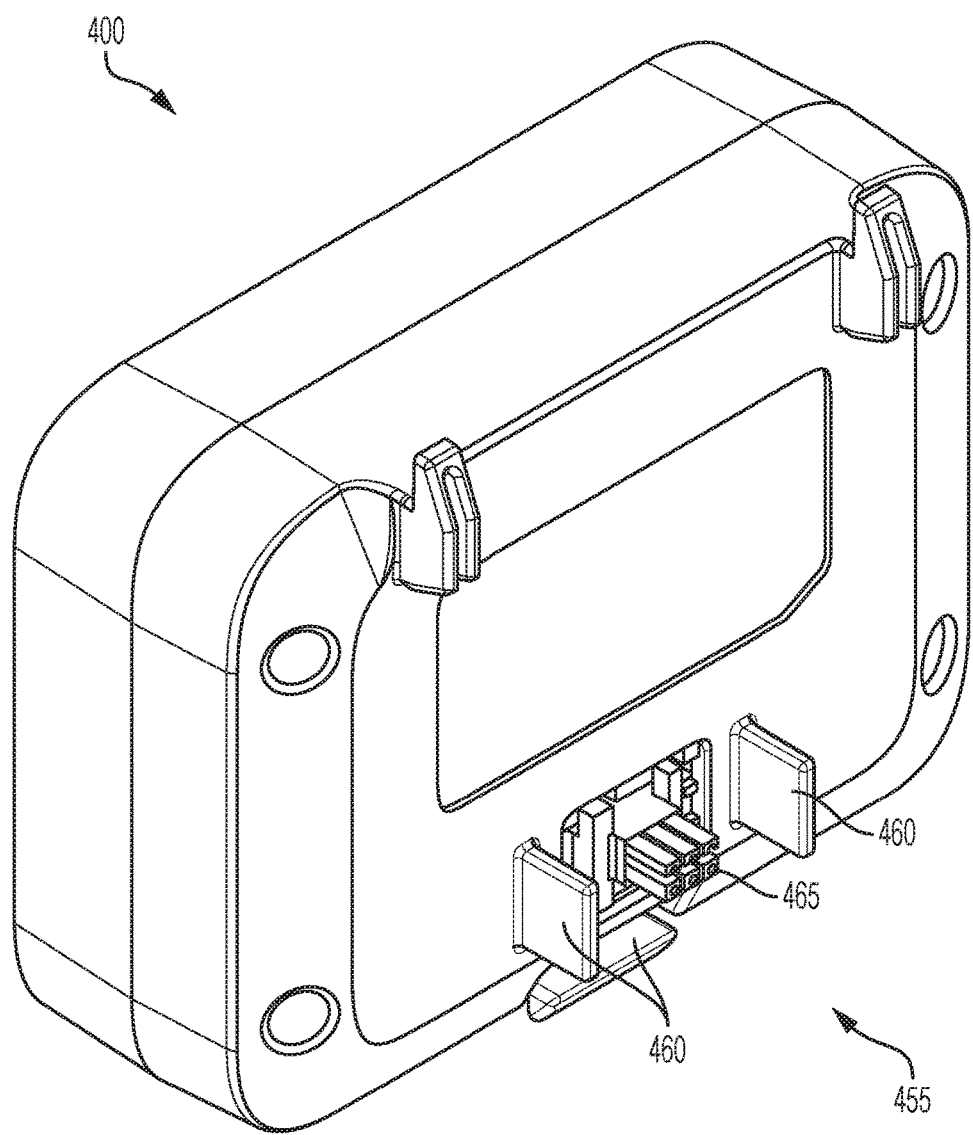
FIG. 7 is a view of the accessory device of FIG. 6.

FIG. 7 illustrates the accessory 400 including an electro-mechanical connector 455, which is one exemplary embodiment of such an electro-mechanical connector enabling the selective attachment and removal of the accessory 400 to the garage door opener 100. The electro-mechanical connector 455 includes projections 460 and an electrical connector 465. The garage door opener 100 further includes an electro-mechanical receptacle (e.g., one of the module ports 223 of FIG. 3B) for receiving the electro-mechanical connector 455. The particular size, shape, and construction of the accessory 400 illustrated in FIG. 7 is merely an exemplary representation the accessory 400 for purposes of illustrating the electro-mechanical connector 455, and other embodiments of the accessory 400 will have other sizes, shapes, and construction (see, e.g., the fan 194 illustrated in FIG. 2).

In some embodiments, the accessory 400 is wirelessly connected to and physically disconnected from the garage door opener 100. In such instances, the accessory 400 includes a wireless transceiver 445 for communicating with the garage door opener 100, and the power supply 435 includes a separate power source (e.g., a replaceable battery, photovoltaic cells, and the like). Accordingly, the interface 440 includes a wireless connection for communication (e.g., between the wireless transceiver 445 and the wireless transceiver 345 (FIG. 5)), and is without a physical communication connection and power connection to the garage door opener 100. In some embodiments, the accessory 400 includes the wireless transceiver 445 for communicating with the garage door opener 100 and a physical power connection to the garage door opener 100, but is without a physical communication connection. In further embodiments, the accessory 400 does not include the wireless transceiver 445 and, rather, uses a physical communication connection and power connection of the interface 440.

Figure 8:
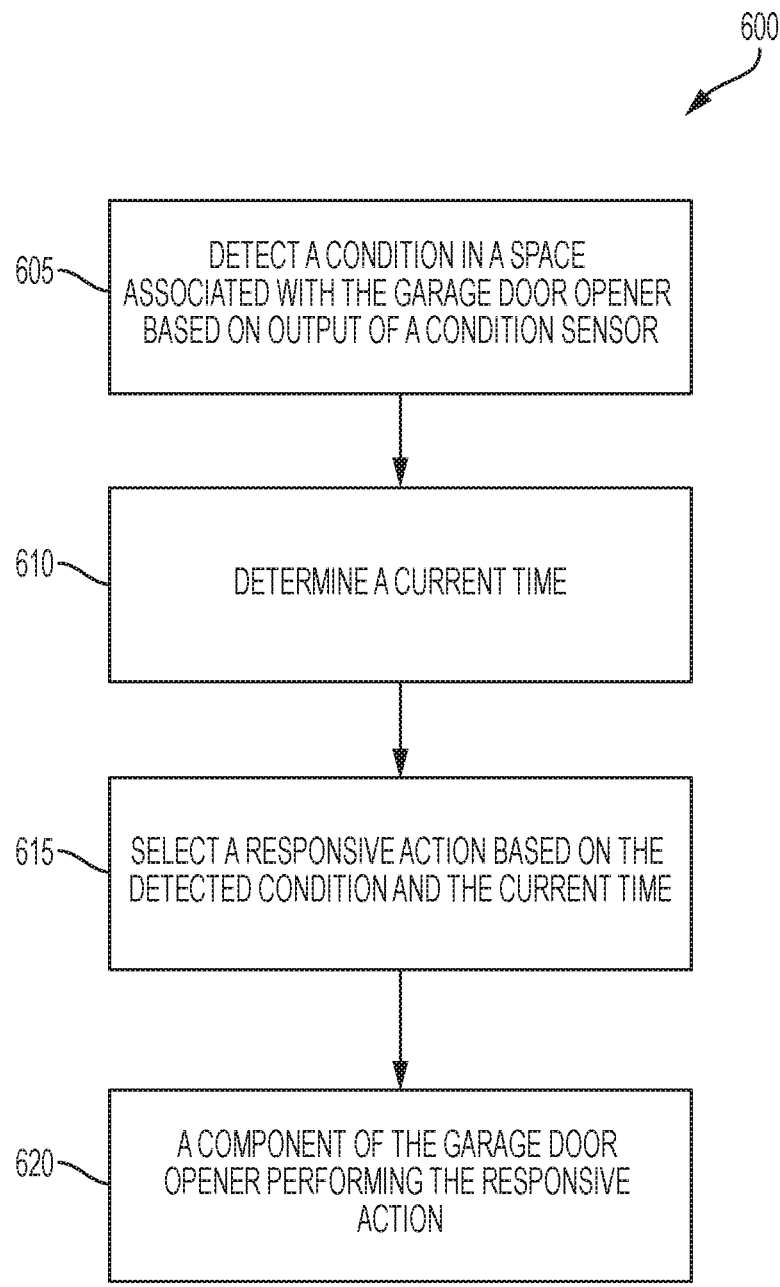
FIG. 8 is flowchart for controlling a garage door opener.

FIG. 8 illustrates a method 600 for controlling the garage door opener 100. In block 605, the processor 350 detects a condition in a space associated with the garage door opener 100 based on output of a condition sensor. The condition sensor may be, for example, the condition sensing component 386, the condition accessory 382, the obstruction sensor 198, or a combination thereof. Examples of the condition sensing component 386 and the condition accessory 382 that may serve as the condition sensor include an environmental sensor, a motion sensor, a garage door position sensor, a door sensor, and a camera. For example, the condition may be detected by the processor 350 in response to the condition sensor outputting an indication of a sensed condition. For example, when the condition sensor is an environmental sensor, such as a temperature, humidity, smoke, or carbon monoxide detector, the environmental sensor is configured to detect an environmental condition (e.g., a measured temperature, humidity, smoke, or carbon monoxide level in the garage in which the garage door opener 100 is located), and provide an indication of the environmental condition to the processor 350. The processor 350 may then compare the received environmental condition to one or more thresholds to determine whether the condition has occurred. For example, the processor 350 may detect the condition in response to determining that the environmental condition exceeds a high threshold (e.g., high temperature), is below a low threshold (e.g., low temperature), within a particular threshold range (e.g., between a low and high temperature threshold). In some embodiments, the environmental sensor determines whether certain thresholds are met and, in response, provides a binary indication of the detected environmental condition (e.g., smoke present or smoke not present) to the processor 350.

In some embodiments, the condition sensor is a motion detector, such as described above, for detecting motion of objects in a space associated with the garage door opener 100. The processor 350 may detect the condition in block 605 in response to an indication of motion from the motion detector.

In some embodiments, the condition sensor is a camera for generating images that are provided to the processor 350 for analysis to detect the condition in block 605. For example, the image analysis of the processor 350 may detect motion (e.g., by comparing one image frame to a later image frame and detecting a difference) or may detect the presence of an object (e.g., by comparing pre-stored images of persons, animals, or bicycles to obtained images from the camera, or using heat mapping). The processor 350 may determine the condition in block 605 in response to detecting motion or the presence of the object based on an output of the camera.

In some embodiments, the condition sensor is a position sensor for detecting a position of the garage door 104. The processor may detect the condition in block 605 based on an output of the position sensor indicating that the garage door 104 is opening, is closing, or is at a predetermined position (e.g., 25%, 50%, or 75% open).

In some embodiments, the condition sensor is a door sensor for detecting a position of a hinged door or lid (independent of the garage door 104). The processor may detect the condition in block 605 based on an output of the door sensor indicating that the sensed door is opened or is closed.

In some embodiments, the condition sensor is the obstruction sensor 198 and the processor 350 detects the condition in block 605 when an output from the obstruction sensor 198 indicates to the processor 350 that an obstruction (e.g., an object) is present.

In block 610, the processor 350 determines the current time from the clock 377. The current time may include time of day, the date, or both.

In block 615, the processor 350 selects a responsive action based on the detected condition and the current time. For example, the memory 355 may include rules specifying one or more responsive actions to be performed dependent on the condition detected in block 605 and the current time at which the condition is detected, as determined in block 610. For example, in some instances, the processor 350 selects a first responsive action when the determined current time is within a first time range (e.g., between 11:00 pm and 4:00 am) and a second responsive action or no responsive action when the determined current time is within a second time range (e.g., between 8:00 am and 5:00 pm). Accordingly, the processor 350 may compare the detected condition and determined current time to the rules and, in response, select the responsive action.

In block 620, the processor 350 controls a component of the garage door opener to perform the responsive action selected in block 615. The component of the garage door opener may be one of the GDO actuatable components 390, the actuatable accessory 384, or a combination thereof. For example, in the case of one of the GDO actuatable components 390 being the controlled component in block 620, the processor 350 may control the motor 212 to open, close, partially open, or partially close; may control the light unit 152 to be enabled to provide illumination, to be disabled, or to flash; or may control the speaker 392 to produce an audible notification. For example, in the case of the actuatable accessory 384 being the controlled component in block 620, the processor 350 may control the load of the actuatable accessory 384 to be enabled, disabled, or perform another action. For example, when the actuatable accessory 384 is the speaker 192, the processor 350 may control the speaker 192 to produce an audible notification, to play audio media (e.g., music), or to connect to an external audio source wirelessly (e.g., pair according to the Bluetooth™ protocol) to begin playback of audio from the external audio source. In another example, when the actuatable accessory 384 is the fan 194, the processor 350 may control the fan 194 to turn on, to turn off, to increase speed, or to decrease speed (e.g., to a non-zero value). In another example, when the actuatable accessory 384 is a camera, the processor 350 may control the camera to begin capturing audio, video, and/or still images, which may be provided to the processor 350 and stored in the memory 355 or on the server memory 305 for access and viewing by a user (e.g., over the network 254 via the personal wireless device 256). In another example, when the actuatable accessory 384 is a parking assist laser, the processor 350 may control the parking assist laser to be enabled to emit a laser marker to assist parking or disabled. In another example, when the actuatable accessory 384 is a flashlight, the processor 350 may control the flashlight to be enabled to provide illumination, to be disabled, or to flash. To control the actuatable accessory 384, the processor 350 may provide a command over an electro-mechanical interface (see, e.g., the interface 440 of FIG. 6) or other data connection (see, e.g., wireless transceiver 445) to the actuatable accessory 384.

In some embodiments, the wireless transceiver 345 is the component of the garage door opener 100 that is controlled in block 620 by the processor 350. In such embodiments, the wireless transceiver 345 may be controlled by the processor 350 to transmit a notification to the server 250 or the personal wireless device 256 via the network 254 for reception by a user. The notification may be displayed on a screen of the personal wireless device 256.

In some embodiments, a combination of two or more components of the garage door opener 100 is controlled to perform one of the aforementioned responsive actions in block 615 (e.g., flash the light unit 152, generate an audible alert with the speaker 392, and send a notification via the wireless transceiver 345).

In some embodiments, the condition detected in block 605 is a first condition, and, in addition to detecting the first condition, the processor 350 detects a second, different condition in block 605 using similar techniques as described above for determining the first condition. In such embodiments, in block 615, the processor selects the responsive action based on the first condition, the second condition, and the current time. Accordingly, as an example, the first condition may be detected in response to the position sensor for the garage door 104 indicating that the garage door 104 is in a partially open state, the second condition may be detected in response to the obstruction sensor 198 indicating an obstruction, and the responsive action selected in block 615 is to send, via the wireless transceiver 345, a notification to the user (e.g., including the message, "Your pet has entered/left the garage."). Similarly, in some embodiments, additional conditions (e.g., a third condition, a fourth condition, etc.) are detected in block 605 and used in block 615 for selecting the responsive action. Accordingly, some embodiments of method 600 may be implemented by the garage door opener 100 to perform one or more responsive actions in response to detecting different combinations of conditions and dependent on the current time.

Figure 9:
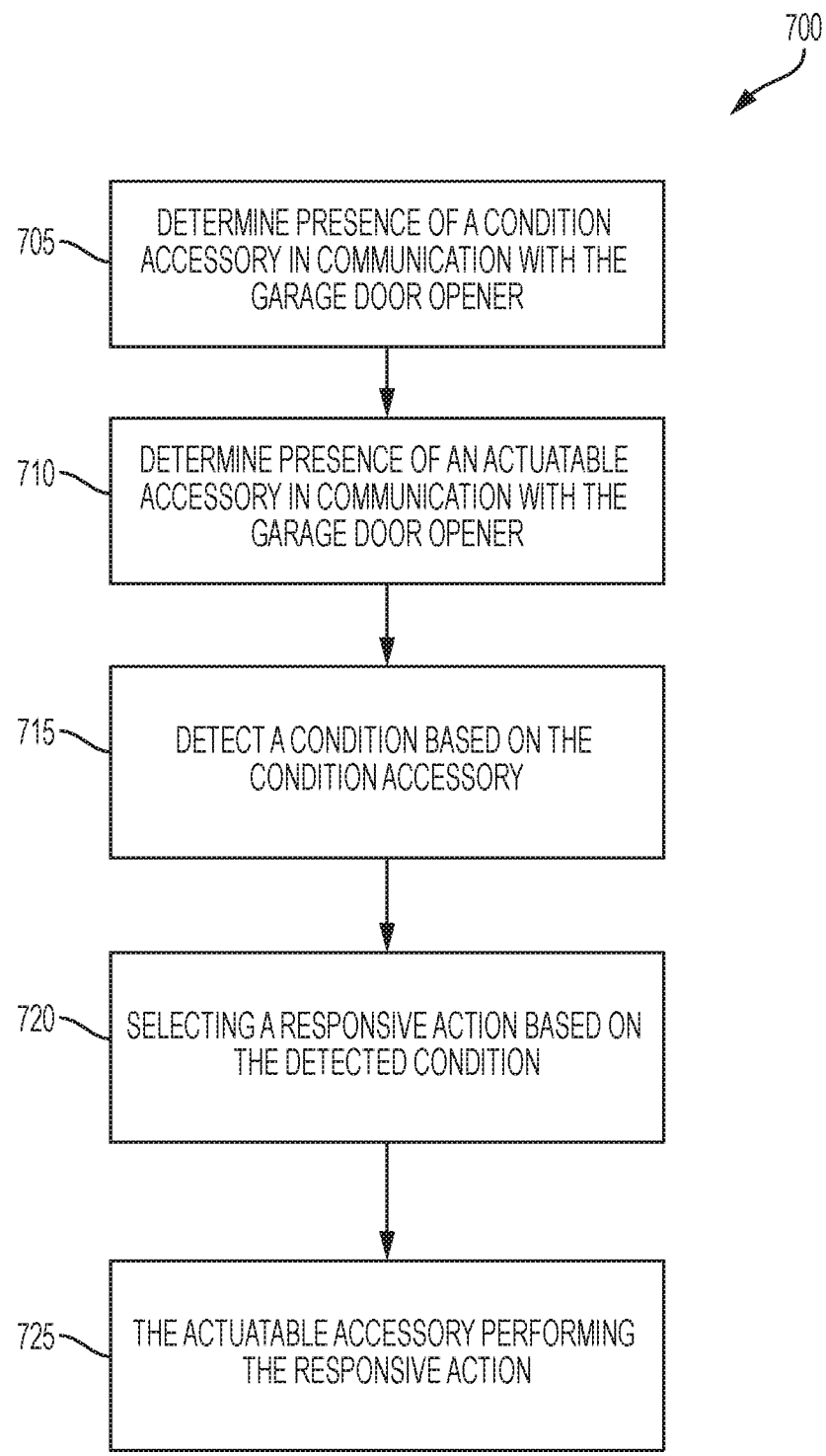
FIG. 9 is another flowchart for controlling an accessory of a garage door opener.

FIG. 9 illustrates a method 700 for controlling the garage door opener 100. In block 705, the processor 350 determines the presence of the condition accessory 382 in communication with the garage door opener 100. The processor 350 may determine the presence of the condition accessory 382 upon receipt of an identifier from the condition accessory 382 that indicates, for example, the type of accessory device (e.g., speaker, fan, etc.). The identifier may be provided, for example, in response to coupling the condition accessory 382 to the garage door opener 100 via an electro-mechanical connector (see, e.g., the electro-mechanical connector 455 of FIG. 6). In block 710, the processor 350 similarly determines the presence of the actuatable accessory 384 in communication with the garage door opener 100.

In block 715, the processor 350 detects a condition based on the condition accessory 382. For example, the processor 350 may detect a condition based on an output of the condition accessory 382 as described above with respect to block 605 of the method 600 (FIG. 8). Additionally, in some embodiments, the processor detects a condition in response to the condition accessory 382 being enabled or disabled. For example, when the condition accessory 382 is the fan 194, the condition is detected by the processor 350 when the fan 194 is enabled or disabled. The processor 350 may detect that the condition accessory 382 is enabled based on output from the condition accessory 382 (e.g., from the accessory processor 415, see FIG. 6), based on detecting power being supplied to the condition accessory 382 (e.g., via a current sensor), or based on receiving an instruction (e.g., from the server 250) to enable the condition accessory 382 and proceeding to enable the condition accessory 382 (e.g., via a command).

In block 720, the processor 350 selects a responsive action based on the detected condition. For example, the memory 355 may include rules specifying one or more responsive actions to be performed dependent on the condition detected in block 715. Accordingly, the processor 350 may compare the detected condition to the rules and, in response, select the responsive action.

In block 725, the processor 350 controls the actuatable accessory 384 to perform the responsive action selected in block 720. The responsive action of the actuatable accessory 384 in block 725 is similar to the examples described above with respect to control of the actuatable accessory 384 in block 620 of the method 600. Accordingly, the examples are not described again in detail but, rather, may be referred to above.

In some embodiments, in block 725, rather than, or in addition to, control of the actuatable accessory 384 in block 725, the processor 350 controls another component of the garage door opener 100, such as the wireless transceiver 345 or one of the GDO actuatable components 390. The responsive action of the another component in these embodiments of block 725 is similar to the examples described above with respect to control of the wireless transceiver 345 and the GDO actuatable components 390 in block 620 of the method 600. Accordingly, the examples are not described again in detail but, rather, may be referred to above.

In some embodiments, the condition detected in block 705 is a first condition and the condition accessory 382 is a first condition accessory, and, in addition to detecting the first condition based on the first condition accessory 382, the processor 350 detects a second, different condition in block 705 based on a second condition accessory using similar techniques as described above for determining the first condition. In such embodiments, in block 720, the processor 350 selects the responsive action based on the first condition and the second condition. Similarly, in some embodiments, additional conditions (e.g., a third condition, a fourth condition, etc.) from additional condition accessories are detected in block 705 and used in block 720 for selecting the responsive action. Accordingly, some embodiments of method 700 may be implemented by the garage door opener 100 to perform one or more responsive actions in response to detecting different combinations of conditions from multiple condition accessories.

Although the blocks (or portions thereof) of methods 600 and 700 are described as being executed by the processor 350 of the garage door opener 100, in some embodiments, one or more blocks are executed by a remote processor, such as the server processor 310. For example, indications used for detecting conditions by the processor 350 are provided to the server processor 310 to detect the conditions, and the server processor 310 selects responsive actions and controls components of the garage door opener 100 to perform the responsive actions.

In some embodiments, the processor 350 receives rules from the server 250 or the personal wireless device 256 provided by a user. For example, the personal wireless device 256 may receive rule configuration input from a user (e.g., via a touchscreen) to generate rules, and provide the rules to the processor 350 for storage in the memory 355 via the network 254. The rules may be generated based on user-specified conditions from a list of conditions available (e.g., that is based on the available condition sensors in communication with the garage door opener 100), and based on user-specified responsive actions from a list of available responsive actions (e.g., that is based on the available actuatable components in communication with the garage door opener 100). Additionally, the rules may be generated based on user-specified time ranges, such that conditions that occur during a first time period cause a first responsive action, while the same conditions occurred during a second time period may cause no responsive action or a second responsive action. For example, a user may specify times that the user is home versus away, and may specify that notification should be sent when the user is away, but not when the user is home.

In some embodiments, the processor 350 records event data 380 based on readings from the various condition sensors including the obstruction sensor 198, the condition sensing component 386, and the condition accessory 382. The processor 350 analyzes the event data 380 to determine time-based patterns of use of components of the garage door opener 100 (e.g., the GDO actuatable components 390 and the actuatable accessory 384). Based on these time-based patterns of use, the processor 350 generates rules stored in the memory 355. The rules are used by the processor 350, for example, in block 615 of the method 600 and block 720 of the method 700, to select responsive actions in response to detected conditions. Accordingly, the processor 350 is operable to learn habitual behavior and generate rules for automated control of components of the garage door opener 100 that align with user or environmental habits. As an example, the processor 350, on weekday mornings, may control the motor 212 to open the garage door 104 fifteen minutes after motion is detected by the condition sensing component 386 (e.g., a PIR motion detector), reflecting the user's habit for loading a car in the garage and then returning to the house for a cup of coffee for fifteen minutes before leaving in the car. In some embodiments, the event data 380 is stored in the server memory 305, and the server processor 310 performs the analysis of the event data 380 and generates the rules for storage in the memory 355 or the server memory 305 and use by the processor 350 or the server processor 310 as previously described.

Table I below lists exemplary rules that may be stored in the memory 355 or the server memory 305 for use by the processor 350 or the server processor 310 in the methods 600 and 700 noted above. The left column includes rule conditions and the right column includes associated rule actions. The rule condition may include conditions and times. When the rule condition is satisfied (e.g., as determined by the processor 350), the rule action is executed (e.g., based on control by the processor 350). The rules of Table I are merely exemplary, as some embodiments of the garage door opener 100 implement various additional rule conditions and rule actions including other combinations of conditions, times, and responsive actions.

TABLE I

EXAMPLE RULES

| Rule Condition | Rule Action |
| --- | --- |
| High temperature from environmental sensor | Turn fan on |
| High humidity from environmental sensor | Close garage door |
| Garage door partially open, obstruction sensor detects obstruction | Send user notification to smart phone that "Your pet has entered/left the garage" |
| Motion detected by PIR motion sensor | Turn security camera on |
| Motion detected by PIR motion sensor | Turn security camera on, turn light unit on, |
| Wireless speaker turns on | Turn fan on |
| Parking laser turns on | Turn on wireless speaker and connect/pair to last known wireless device (e.g., via Bluetooth ™) |
| When fan turns on | Turn on wireless speaker, parking laser, or both |
| When parking laser turns on | Turn fan on |
| When high temperature detected by environmental sensor | Turn on one or more of the fan, wireless speaker, and parking laser |
| When low temperature detected by environmental sensor | Turn on one or more of the fan, wireless speaker, and parking laser |
| When high humidity detected by environmental sensor | Turn on one or more of the fan, wireless speaker, and parking laser |

TABLE I-continued

EXAMPLE RULES

| Rule Condition | Rule Action |
| --- | --- |
| When low humidity detected by environmental sensor | Turn on one or more of the fan, wireless speaker, and parking laser |
| Motion detected by PIR motion sensor | Turn on one or more of the fan, wireless speaker, parking laser, light unit, and camera to record video |
| Motion detected by camera | Turn on one or more of the fan, wireless speaker, parking laser, light unit, and camera to record video |
| Motion detected by motion sensor, garage door closed, current time is between 11:00 pm and 5:00 am | Send user notification that motion detected in garage |
| Detect garage door opening | Turn on parking laser |
| Detect garage door open and obstruction sensor detects obstruction | Turn on parking laser (e.g., presuming car is entering previously opened garage) |
| Obstruction sensor detects obstruction, garage door open, current time is between 11:00 pm and 5:00 am | Flash light unit and generate beep (e.g., presuming intruder is present) |

Accordingly, embodiments disclosed herein enable enhanced control of components and accessories of a garage door opener. In response to conditions external to the garage door opener, which are detected by sensors associated with the garage door opener, accessories of the garage door opener can be activated, thus allowing the garage door opener to perform for the user certain operations. Further, where conditions are linked to time of day, detection of conditions and response to the conditions enables response by components of the garage door opener to respond to conditions detected by the garage door opener in a time-appropriate fashion. Further, embodiments disclosed herein provide the ability for user-controlled responses to conditions to be learned by the garage door opener, the server, or another related systems, and to be encoded as rules that are used by the garage door opener to respond to similar conditions that are later detected. Some embodiments disclosed herein include other advantages not expressly listed as well.

Although the methods described herein are described in a particular order and serially, one or more blocks of these methods may be performed in a different order than illustrated, in parallel with one or more other blocks, or a combination thereof.

The processors described herein may be configured to carry out the functionality attributed thereto via execution of instructions stored on a computer readable medium (e.g. one of the illustrated memories), in hardware circuits (e.g., an application specific integrated circuit (ASIC) or field programmable gate array) configured to perform the functions, or a combination thereof.

Although the invention has been described in detail with reference to certain preferred embodiments, variations and modifications exist within the scope and spirit of one or more independent aspects of the invention as described.

What is claimed is:

1. A method for controlling a garage door opener, the method comprising:
    detecting, by an electronic processor of the garage door opener, a condition in a space associated with the garage door opener based on an output received from a condition sensor of the garage door opener;
    determining, by the electronic processor, a time associated with the condition detected in the space associated with the garage door opener;
    selecting, by the electronic processor, a responsive action based on the condition detected in the space associated with the garage door opener and the time associated with the condition detected; and
    controlling, by the electronic processor, an actuatable component of the garage door opener to perform the responsive action.

2. The method of claim 1, wherein the condition sensor is at least one selected from the group consisting of an environmental sensor, a motion sensor, a garage door position sensor, a door sensor, an obstruction sensor, and a camera.

3. The method of claim 1, further comprising:
    detecting, by the electronic processor, a second condition in the space associated with the garage door opener based on a second output received from a second condition sensor of the garage door opener; and
    determining, by the electronic processor, a time associated with the second condition detected in the space associated with the garage door opener,
    wherein selecting, by the electronic processor, the responsive action is further based on the second condition detected in the space associated with the garage door opener.

4. The method of claim 1, wherein the actuatable component is an accessory device selectively attached to an electromechanical port of the garage door opener and is at least one selected from the group consisting of: a backup battery unit, a speaker, a fan, an extension cord reel, a parking assist laser, an environmental sensor, a flashlight, and a security camera.

5. The method of claim 1, the method further comprising:
    detecting, by the electronic processor, a second condition in the space associated with the garage door opener based on a second output received from a second condition sensor of the garage door opener;
    selecting, by the electronic processor, a second responsive action based on the second condition detected in the space associated with the garage door opener; and
    controlling, by the electronic processor, a second actuatable component of the garage door opener to perform the second responsive action, wherein the second actuatable component includes at least one selected from the group consisting of: a motor that controls opening and closing functions of a garage door and a light unit of the garage door opener.

6. A garage door opener comprising:
a housing;
a motor within the housing and configured to drive a garage door;
a condition sensor configured to sense conditions in a space associated with the garage door opener;
an actuatable component;
a memory storing instructions;
an electronic processor communicatively coupled to the memory and operable to retrieve and execute the instructions, a clock, the actuatable component, and the condition sensor, wherein the electronic processor is configured to:
   detect a condition in the space associated with the garage door opener based on an output of the condition sensor;
   determine a time associated with the condition detected in the space associated with the garage door opener;
   select a responsive action based on the condition detected in the space associated with the garage door opener and the associated time; and
   control the actuatable component to perform the selected responsive action.

7. The garage door opener of claim 6, wherein the electronic processor determines the responsive action based on a rule stored in the memory that specifies that the responsive action corresponds to the condition detected in the space associated with the garage door opener and the associated time.

8. The garage door opener of claim 6, wherein the condition sensor is at least one selected from the group consisting of an environmental sensor, a motion sensor, a garage door position sensor, a door sensor, an obstruction sensor, and a camera.

9. The garage door opener of claim 6, wherein the electronic processor is further configured to:
   detect a second condition in the space associated with the garage door opener based on a second output received from a second condition sensor of the garage door opener,
   determine a time associated with the second condition detected in the space associated with the garage door opener, and
   select the responsive action further based on the second condition detected in the space associated with the garage door opener.

10. The garage door opener of claim 6, wherein the actuatable component is an accessory device selectively attached to an electromechanical port of the garage door opener and is at least one selected from the group consisting of: a backup battery unit, a speaker, a fan, an extension cord reel, a parking assist laser, an environmental sensor, a flashlight, and a security camera.

11. A method for controlling a garage door opener, the method comprising:
   determining, by an electronic processor, a presence of a condition accessory selectively attached and in communication with the garage door opener;
   determining, by the electronic processor, a presence of an actuatable accessory selectively attached and in communication with the garage door opener;
   detecting, by the electronic processor, a condition sensed by the condition accessory in communication with the garage door opener;
   selecting, by the electronic processor, a responsive action based on the detected condition sensed by the condition accessory in communication with the garage door opener; and
   controlling, by the electronic processor, the actuatable accessory in communication with the garage door opener to perform the responsive action.

12. The method of claim 11, further comprising:
receiving a first identifier from the condition accessory in communication with the garage door opener, the first identifier used by the electronic processor to determine the presence of the condition accessory, and
receiving a second identifier from the actuatable accessory in in communication with the garage door opener, the second identifier used by the electronic processor to determine the presence of the actuatable accessory.

13. The method of claim 11, further comprising:
comparing, by the electronic processor, the detected condition sensed by the condition accessory to a set of rules stored in a memory in communication with the electronic processor, and
utilizing, by the electronic processor, a rule of the set of rules that corresponds to the detected condition sensed by the condition accessory to make the selection of the responsive action based on the detected condition sensed by the condition accessory in communication with the garage door opener.

14. The method of claim 11 further comprising:
controlling, by the electronic processor, an actuatable component of the garage door opener to perform a second responsive action in response to the detected condition, in addition to controlling the actuatable accessory in communication with the garage door opener to perform the responsive action, the actuatable component of the garage door opener being integrated and hardwired into the garage door opener and being at least one selected from the group consisting of a motor, a light, and a speaker.

15. The method of claim 11, further comprising:
wherein the condition detected is a first condition and the condition accessory is a first condition accessory, and, in addition to detecting the first condition based on the first condition accessory, detecting a second condition based on a second condition accessory, and
wherein selecting the responsive action is further based on the first condition and the second condition.

16. A garage door opener comprising:
a condition accessory selectively attached and in communication with the garage door opener;
an actuatable accessory selectively attached and in communication with the garage door opener;
a memory storing instructions;
an electronic processor communicatively coupled to the memory and operable to retrieve and execute the instructions, the electronic processor configured to:
   determine a presence of the condition accessory selectively attached and in communication with the garage door opener;
   determine a presence of the actuatable accessory selectively attached and in communication with the garage door opener;
   detect a condition based on the condition accessory;
   select a responsive action based on the detected condition; and
   control the actuatable accessory to perform the responsive action.

17. The garage door opener of claim 16, wherein the electronic processor is further configured to:
   receive an identifier from the condition accessory for the determination of the presence of the condition accessory, and
   receive an identifier from the actuatable accessory for the determination of the presence of the actuatable accessory.

18. The garage door opener of claim 16, wherein the electronic processor is further configured to:
   compare the detected condition sensed by the condition accessory to a set of rules stored in the memory, and
   utilize a rule of the set of rules that corresponds to the detected condition sensed by the condition accessory to make the selection of the responsive action based on the detected condition sensed by the condition accessory.

19. The garage door opener of claim 16, wherein the electronic processor is further configured to:
   control an actuatable component of the garage door opener to perform a second responsive action in response to the detected condition, in addition to the control of the actuatable accessory in communication with the garage door opener to perform the responsive action, the actuatable component of the garage door opener being integrated and hardwired into the garage door opener and being at least one selected from the group consisting of a motor, a light, and a speaker.

20. The garage door opener of claim 16, wherein the condition detected is a first condition, the condition accessory is a first condition accessory, and in addition to detecting the first condition based on the first condition accessory, the electronic processor is further configured to:
   detect a second condition based on a second condition accessory; and
   select the responsive action based on the first condition and the second condition.

* * * * *